United States Patent Office 2,980,738
Patented Apr. 18, 1961

2,980,738

PROCESS FOR PREPARING HYDRATES OF ALIPHATIC FLUOROOXOCARBONYL COMPOUNDS

Richard M. Scribner, Wilmington, Del., assignor to E. I. du Pont de Nemours and Company, Wilmington, Del., a corporation of Delaware No Drawing. Filed Sept. 23, 1959, Ser. No. 841,692

9 Claims. (Cl. 260—633)

This invention relates to, and has as its principal object provision of, a simple and economic method for preparing hydrates of selected aliphatic fluorocarbonyl compounds.

The aliphatic fluoroaldehydes are an extremely reactive class of compounds and on standing decompose with loss of carbon monoxide. They also react readily with moisture to form the corresponding monohydrates. Little is known about the chemistry of the aldehyde and ketone hydrates. The present invention provides a simple and economic method which makes the hydrates of aliphatic fluoroaldehydes and ketones readily accessible.

According to this invention, hydrates of aliphatic fluorooxocarbonyl compounds, i.e., fluoroaldehydes and ketones, are obtained by reacting a fluoroalcohol corresponding to one of the general formulae,

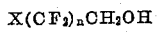

and

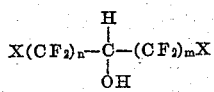

wherein X is hydrogen or halogen of atomic number 9 to 35, i.e., fluorine, chlorine, and bromine, and $m$ and $n$ are integers from 1 to 20, with nitrogen dioxide at a temperature of at least 100° C.

In one convenient method for preparing the hydrates of the aforementioned haloaldehydes and haloketones, i.e., of fluoroaldehydes and fluoroketones, a mixture consisting of nitric oxide, oxygen, and haloalcohol, e.g., a fluoroalcohol, is continuously passed over a contact surface heated to at least 100° C., the reaction products passed through an air condenser, and then to a receptacle cooled in an acetone-solid carbon dioxide bath. The solid material which adheres to the condenser is collected and comprises the desired fluoroaldehyde or fluoroketone hydrate.

The examples which follow illustrate but do not limit this invention. In these examples all pressures are ambient atmospheric unless otherwise indicated.

*Example I*

Into the top of a heat-resistant glass tube (4 cm. inside diameter) partly filled with 200 cc. of quartz chips (6–14 mesh) and heated at 375–382° C. by a vertical electric furnace was metered a mixture of nitric oxide (2.5 ml./sec.) and air (2.5 ml./sec.) while 20 grams of 1H,1H,7H-dodecafluoro-1-heptanol was added dropwise from a dropping funnel over a period of 1.5 hours. Attached in series to the bottom of the heat-resistant glass reaction tube was an air condenser about 2.5 cm. in diameter and 55 cm. long, and a two-necked round-bottomed flask immersed in a solid carbon dioxide-acetone cooling bath. When addition of the fluoroalcohol had been completed, the air condenser was removed and solid adhering to its walls was scraped loose, giving 8.0 grams of a white solid, M.P. 58–60° C., identified as 1H,7H-dodecafluoro-1,1-heptandiol.

*Analysis.*—Calcd. for $C_7H_4F_{12}O_2$: C, 24.2; H, 1.15; F, 65.5; M.W., 348. Found: C, 24.30; H, 1.61; F, 64.91; M.W., 373, 384.

Recrystallization of the solid from benzene gave waxy plates, M.P. 70–71° C. (Brace, U.S. Patent 2,842,601/58, claims a M.P. of 74° C. for $H(CF_2)_6CH(OH)_2$). Comparison of the infrared spectrum of this solid with that obtained from an authentic sample (prepared after Brace) showed them to be identical, having bands in common at 2.9–3.3μ (hydroxyl), 7.50μ, 7.90μ, 8–9μ (fluorine), 9.15μ, 9.30μ, 10.30, 10.83μ, 12.15μ, 12.57μ, 13.32μ, 14.20μ, and 15.10μ.

Evaporation of the oxides of nitrogen from the two-necked flask that had been cooled in the solid carbon dioxide-acetone mixture gave 3 grams of a viscous liquid that, according to infrared analysis, was impure 1H,7H-dodecafluoro-1,1-heptandiol.

In a second experiment 20 grams of 1H,1H,7H-dodecafluoro-1-heptanol was added over a two hour period to the same heat-resistant glass tube filled with 300 cc. of quartz chips and heated at 306–315° C. while nitric oxide and air were added at the rates of 1.87 ml./sec. and 4.15 ml./sec., respectively. In this case the solid reaction product scraped from the air condenser weighed 13 g. and melted at 60–63° C. Recrystallization of this material from 30 ml. of benzene gave 1H,7H-dodecafluoro-1,1-heptandiol, M.P. 67° C., shown by its reaction with hydroxylamine hydrochloride in methanol followed by titration of liberated hydrogen chloride to be 95% pure aldehyde hydrate.

*Example II*

1H,1H,9H-hexadecafluoro-1-nonanol (20 g.) was added over a two hour period to a heat-resistant glass tube filled with 300 cc. of quartz chips (6–14 mesh) and heated at 300° C. while nitric oxide (2.5 ml./sec.) and air (4.0 ml./sec.) were metered into the tube. When addition of the alcohol had been completed, 13 g. of a white solid, M.P. 80–84° C., was scraped from the walls of the air condenser and 5.5 g. of a slightly moist solid, M.P. 79–83° C. after air drying, was isolated from the flask cooled in the solid carbon dioxide-acetone mixture. The higher melting solid analyzed as follows:

*Analysis.*—Calcd. for $C_9H_4F_{16}O_2$: C, 24.1; H, 0.90; F, 67.7; M.W., 449. Found: C, 24.36, 24.27; H, 1.28, 1.21; F, 67.01, 67.17; M.W., 460, 460.

Reaction of this crude aldehyde hydrate, 1H,9H-hexadecafluoro-1,1-nonandiol, with hydroxylamine hydrochloride in methanol and titration of hydrogen chloride liberated showed that it was 93% pure.

Recrystallization of the aldehyde hydrate (8 g.) from benzene (40 ml.) gave a waxy amorphous solid (2.8 g.), M.P. 95–96° C. Concentration of the mother liquor to 20 ml. gave an additional crop of white solid (0.3 g.), M.P. 105–107° C. Brace (ibid.) reports the melting points of two forms of the aldehyde hydrate to be 95–96° C. and 105–106° C., respectively. The infrared spectrum of the compound melting at 95–96° C. obtained in this work was identical to the spectrum of Brace's compound melting at 105–106° C. Both spectra had bands at 2.95μ (hydroxyl), 8.35μ, 8.60μ, 8.75μ, 9.05μ, 9.60μ, 10.31μ, 11.28μ, 11.83μ, 11.97μ, 12.36μ, 12.83μ, 14.0μ, 14.15μ, 14.36μ, and 15.20μ.

Reaction of crude 1H,9H-hexadecafluoro-1,1-nonandiol with a water-ethanol solution of 2,4-dinitrophenylhydrazine 6 N in sulfuric acid gave a 2,4-dinitrophenylhydrazone, M.P. 122° C. Brace (ibid.) reports a melting point of 124.5° C. for the 2,4-dinitrophenylhydrazone of the corresponding aldehyde.

In a similar experiment 20 g. of 1H,1H,9H-hexadecafluoro-1-nonanol was added over a three hour period to a quartz-packed tube heated at 268–270° C. while nitric oxide (2.8 ml./sec.) and air (4.2 ml./sec.) were metered into the tube simultaneously. This gave 6.6 g. of a white, solid product (M.P. 90–92° C.) on the walls of the air condenser and 8.3 g. of mushy solid in the flask cooled in the solid carbon dioxide-acetone mixture. Vapor-phase chromatography of the former solid in a high temperature (175° C.) column showed that it was 85% aldehyde hydrate and 6% unchanged alcohol. Less than one-tenth percent 9H-hexadecafluorononanoic acid was present.

*Example III*

1H,1H,11H-eicosafluoro-1-undecanol (60 grams), nitric oxide (5.5 ml./sec.), and air (8.3 ml./sec.) were added over a period of 3½ hours to a heat-resistant glass tube partly filled with 200 cc. of quartz chips heated at 320° C. The combined weight of solid products, M.P. 85–92° C., in the air condenser and flask cooled in solid carbon dioxide-acetone mixture was 55 g.

Reaction of the crude 1H,11H-eicosafluoro-1,1-undecandiol with hydroxylamine hydrochloride in methanol followed by titration of the hydrogen chloride evolved showed that it was 40% pure. Vapor-phase chromatography in a column maintained at 175° C. showed that the crude product contained about 43% 1H,11H-eicosafluoro-1,1-undecandiol, 4% of 1H,9H-hexadecafluoro-1,1-nonandiol, 50% of unchanged 1H,1H,11H-eicosafluoro-1-undecanol and about four minor impurities. Less than one-tenth of one percent 11H-eicosafluoroundecanoic acid was present.

Recrystallization of the crude reaction product three times from benzene gave pure aldehyde hydrate, M.P. 113–114° C. The infrared spectrum showed strong bands at 3.0μ (hydroxyl), 8.30μ, 8.70μ, 12.10μ, and 15.20μ. (Brace gives no melting point or infrared spectrum for this component.) The 2,4-dinitrophenylhydrazone melted at 141–143° C. (Brace reports 146° C.)

*Example IV*

When 1H,3H,5H-octafluoro-3-pentanol together with nitric oxide (5.5 ml./sec.) and air (8.3 ml./sec.) were passed through a tube packed with quartz chips (6–14 mesh) heated at 320° C., there was obtained a mixture containing 77% unchanged alcohol, 17% of 1H,5H-octafluoro-3,3-pentandiol, together with 6% of an unknown product. When the same alcohol was added together with nitric oxide (5.5 ml./sec.) and air (8.3 ml./sec.) to the same heat-resistant glass tube heated at 400° C., the 1H,5H-octafluoro-3,3-pentandiol was obtained in 54% conversion together with 5% unchanged alcohol. Analysis of the reaction product was carried out by means of vapor-phase chromatography, the retention times of the diol being established by comparison with an authentic sample prepared by the chromic acid oxidation of 1H,3H,5H-octafluoro-3-pentanol.

The detailed examples have illustrated certain preferred specific embodiments.

The oxidation of the fluoroalcohols is effected at temperatures which are at least 100° C. but not above 500° C. when operating with a contact time of from 6–12 seconds and with a solid contact surface. Most generally temperatures in the range of 250° to 400° C. are used and this embraces the conditions of temperature most usually employed.

As previously indicated, the alcohols treated in accord with this invention correspond either to X(CF₂)ₙCH₂OH or to X(CF₂)ₙ—CHOH)CF₂)ₙX in which X is hydrogen or halogen of atomic number 9 to 35, especially fluorine, and n is an integer from 1 to 20. Examples of such compounds are 2,2,2-trifluoroethanol,
2,2,3,3,3-pentafluoropropanol,
1H,1H,3H-tetrafluoropropanol,
2,2,3,3,4,4,4-heptafluorobutanol,
1H,1H,5H-octafluoropentanol-1,
1H,1H,5H,1,1,2-trifluoro-2,2-dichloropropanol-1,
1,1,2-trifluoro-2,2-dibromopropanol-1,
1,1,1,3,3,4,4,5,5-decafluoropentanol-2,
2,2,3,3,4,4,5,5-nonafluoropentanol-1,
1,1,1,2,2,4,4,5,5,6,6,6-dodecafluorohexanol-3,
2,2,3,3,4,4,5,5,6,6,6-undecafluorohexanol-1,
4H-dodecafluoroheptanol-4,
4H-tetradecafluorooctanol-4,
3H-tetradecafluorooctanol-3,
1H,1H-tricosafluorotridecanol-1, and the like.

In the detailed examples the nitrogen dioxide has, for the sake of convenience, been made in situ by mixing measured amounts of air with a small excess of nitric oxide, the formation of nitrogen dioxide being indicated by the appearance of a red gas at the point of mixing. Preformed pure nitrogen dioxide or nitrogen dioxide diluted with an inert gas such as nitrogen or helium may be used equally as well as that produced in situ. It may be noted that neither nitric oxide nor oxygen alone is operative in the claimed process.

The aldehyde hydrates and ketone hydrates are useful as chemical intermediates. For example, 1H,11H-eicosafluoro-1,1-undecandiol reacts with an acidified, aqueous alcohol solution of N-formyl-p-tricyanovinylphenyl-hydrazine to give a dye (M.P. 162–165° C.), an aqueous suspension of which imparts an orange color to wool, nylon, and silk.

Fluorocarbon aldehydes are very sensitive to moisture and polymerize rapidly at room temperature. In contrast, the aldehyde hydrates are quite stable and in many aldehyde reactions the hydrate is a satisfactory replacement for the free aldehyde. Accordingly, methods which provide the hydrate are important. The process of this invention makes these interesting chemical compounds available from readily accessible intermediates and represents a marked technical advance.

Since obvious modifications and equivalents in the invention will be evident to those skilled in the chemical arts, I propose to be bound solely by the appended claims.

The embodiments of the invention in which an exclusive property or privilege is claimed are defined as follows:

1. The process for preparing hydrates of aliphatic fluorooxocarbonyl compounds which comprises reacting a fluoroalcohol from the group consisting of

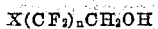

and

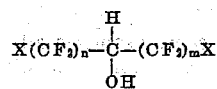

wherein X is selected from the group consisting of hydrogen and halogen of atomic number less than 36 and m and n are integers of from 1 to 20, with a member of the group consisting of nitrogen dioxide and a mixture of nitric oxide and oxygen at a temperature in the range between 100° and 500° C.

2. The process of claim 1 wherein the member from the group consisting of nitrogen dioxide and a mixture of nitric oxide and oxygen and the fluoroalcohol are reacted continuously.

3. The process of claim 2 wherein the reactants are continuously passed over a contact surface heated to a temperature in the range between 100° and 500° C.

4. The process of claim 1 wherein the temperature is in the range between 250° and 400° C.

5. The process of claim 3 wherein the temperature is in the range between 250° and 400° C.

6. The process for preparing 1H,7H-dodecafluoro-1,1-heptanediol which comprises reacting 1H,1H,7H-dodecafluoro-1-heptanol with a member of the group consisting of nitrogen dioxide and a mixture of nitric oxide and oxygen at a temperature in the range between 100° and 500° C.

7. The process for preparing 1H,9H-hexadecafluoro-1,1-nonandiol which comprises reacting 1H,1H,9H-hexadecafluoro-1-nonanol with a member of the group consisting of nitrogen dioxide and a mixture of nitric oxide and oxygen at a temperature in the range between 100° and 500° C.

8. The process for preparing 1H,11H-eicosafluoro-1,1-undecandiol which comprises reacting 1H,1H,11H-eicosafluoro-1-undecanol with a member of the group consisting of nitrogen dioxide and a mixture of nitric oxide and oxygen at a temperature in the range between 100° and 500° C.

9. The process for preparing 1H,5H-octafluoro-3,3-pentandiol which comprises reacting 1H,3H,5H-octafluoro-3-pentanol with a member of the group consisting of nitrogen dioxide and a mixture of nitric acid and oxygen at a temperature in the range between 100° and 500° C.

No references cited.

UNITED STATES PATENT OFFICE
CERTIFICATION OF CORRECTION

Patent No. 2,980,738 April 18, 1961
Richard M. Scribner

It is hereby certified that error appears in the above numbered patent requiring correction and that the said Letters Patent should read as corrected below.

Column 2, line 13, for "10.30" read -- 10.30µ --; column 3, line 72, the formula should appear as shown below instead of as in the patent:

column 4, line 6, strike out "1H,1H,5H,1,1,2-trifluoro-2,2-dichloropropanol-1,"; line 7, strike out "1,1,2-trifluoro-2,2-dibromopropanol-1,"; line 12, for "4H-dodecafluoroheptanol-4," read -- 4H-tetradecafluoroheptanol-4, --; line 13, for "4H-tetradecafluorooctanol-4," read -- 4H-hexadecafluorooctanol-4, --; line 14, for "3H-tetradecafluorooctanol-3," read -- 3H-hexadecafluorooctanol-3, --; same column 4, line 15, for "1H,1H-tricosafluorotridecanol-1," read -- 1H,1H-pentacosafluorotridecanol-1, --.

Signed and sealed this 3rd day of October 1961.

(SEAL)
Attest:

ERNEST W. SWIDER
Attesting Officer

DAVID L. LADD
Commissioner of Patents